S. C. WALLACE.
RESILIENT WHEEL.
APPLICATION FILED MAR. 29, 1917.

1,259,058.

Patented Mar. 12, 1918.

Witnesses

Inventor
S. C. Wallace

By
Attorneys

S. C. WALLACE.
RESILIENT WHEEL.
APPLICATION FILED MAR. 29, 1917.
1,259,058.
Patented Mar. 12, 1918.
2 SHEETS—SHEET 2.
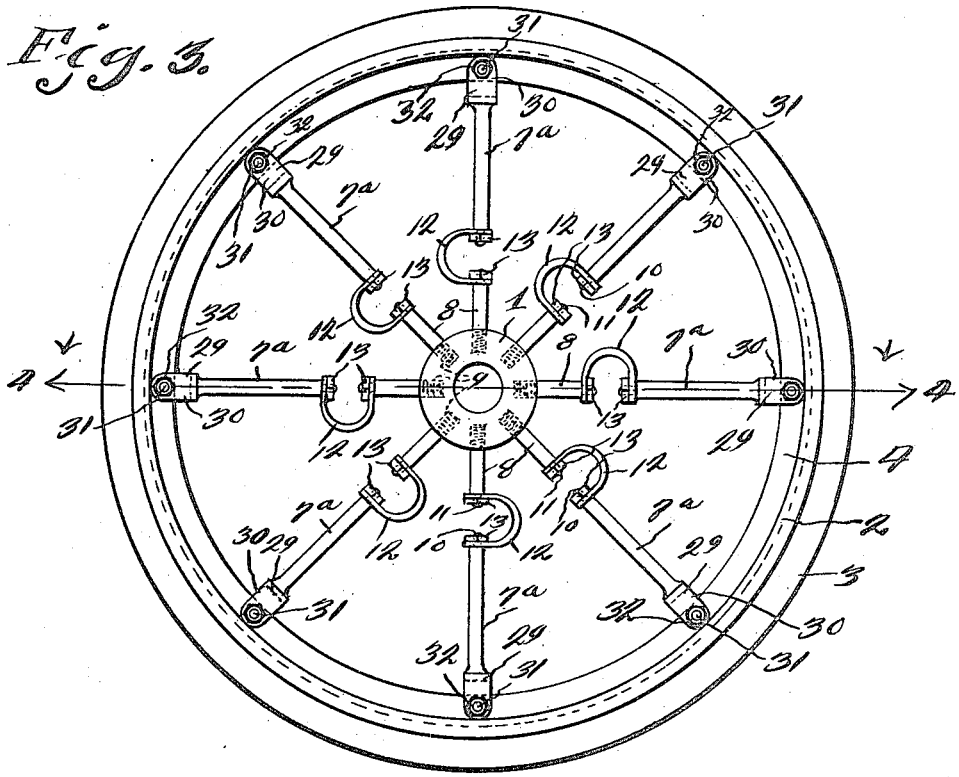
Witnesses
Inventor
S. C. Wallace
By
Attorneys

UNITED STATES PATENT OFFICE.

SIDNEY C. WALLACE, OF CHICAGO, ILLINOIS.

RESILIENT WHEEL.

1,259,058.　　　　Specification of Letters Patent.　　Patented Mar. 12, 1918.

Application filed March 29, 1917. Serial No. 158,354.

*To all whom it may concern:*

Be it known that I, SIDNEY C. WALLACE, a citizen of the United States, residing at Chicago, in the county of Cook, State of Illinois, have invented a new and useful Resilient Wheel; and I do hereby declare the following to be a full, clear, and exact description of the invention, such as will enable others skilled in the art to which it appertains to make and use the same.

This invention relates to a new and useful wheel, and one of the objects of the invention is to provide a series of spokes, each consisting of a cylinder pivoted to the rim of the wheel and having a yieldably mounted piston therein, which, in turn has a yieldable coupling or connection with the hub of the wheel.

A further object of the invention is to provide anti-frictional ball bearings for the yieldably mounted pistons of each cylinder.

A further object is to provide a device of this kind provided with sectional spokes, one section of each spoke having a pivotal connection with the rim, while the other section is rigidly connected to the hub, there being a bowed yieldable spring coupling the two sections.

In practical fields, the details of construction may necessitate alterations falling within the scope of what is claimed.

The invention comprises further features and combination of parts, as hereinafter set forth, shown in the drawings and claimed.

In the drawings:—

Fig. 3 is a view in side elevation showing cylinders of the spokes dispensed with.

Fig. 4 is a sectional view on line 4—4 of Fig. 3.

Figure 1:
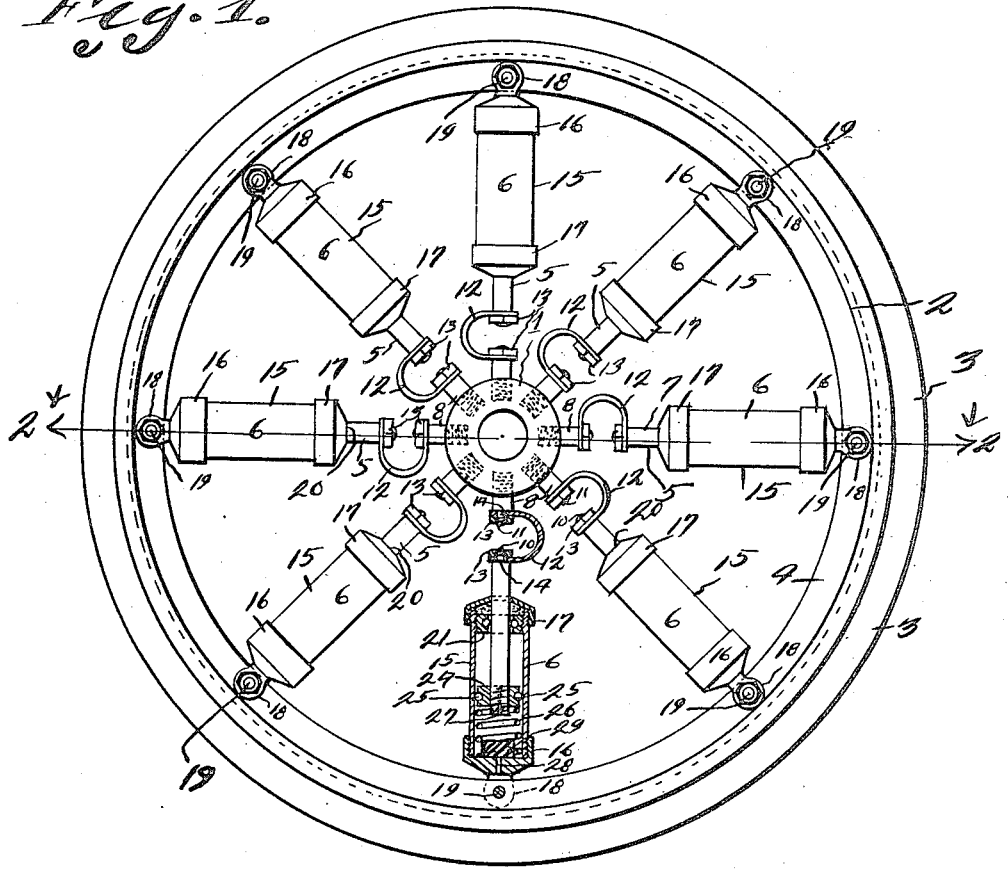
Figure 1 is a view in side elevation of a resilient wheel, constructed in accordance with the invention.

Referring more especially to the drawings, 1 designates a hub, and 2 the rim of the wheel. The rim is channeled, as shown, and may receive any suitable tire 3. The rim 2 has an inwardly extending annular flange 4 and each spoke 5 of the wheel shown in Fig. 1 comprises the cylinder section 6, the piston section 7, and the section 8, which is connected rigidly to the hub 1 by threading the same into a socket 9. The inner end of the piston section 7 has a reduced threaded extension 10 and the outer end of the section 8 is provided with a similar reduced threaded extension 11. The opposite ends of a bowed spring 12 having openings to receive the threaded extensions 10 and 11 of the piston section and the section 8 of each spoke of the wheel, there being nuts 13 threaded on said reduced extensions 10 and 11, to hold the bowed spring securely connected. These reduced extensions 10 and 11, where they engage the opposite ends of the bowed spring are provided with rectangular parts 14, to prevent turning of the bowed spring to a position at right angles to the plane of the wheel. Each cylinder section consists of the cylinder 15 and the caps 16 and 17, which caps are threaded on the cylinder 15. The cap 16 is provided with the ears 18, between which the flange 4 engages, there being a bolt 19 pivotally connecting said ears to the flange. The cap 17 has a guide opening 20 for the piston section. A suitable bushing 21 is threaded into the cylinder 15 adjacent its inner end, there being anti-frictional ball bearings 22 carried by the bushing, and to be engaged by the piston section, which moves telescopically through the guide opening 20 and through the bushing 21.

Figure 2:
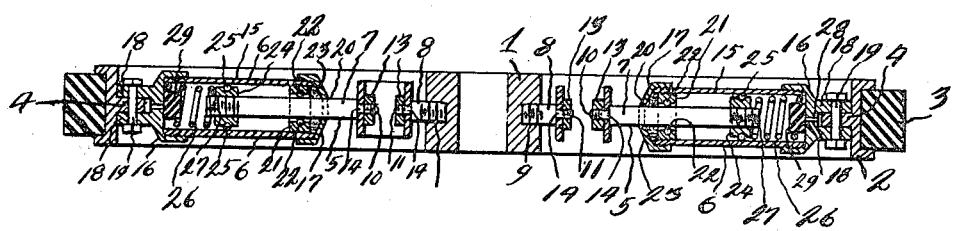
Fig. 2 is a sectional view on line 2—2 of Fig. 1.

Interposed between the bushing 21 and the cap 17, is a filling or packing of felt, waste or the like 23, saturated in some suitable lubricant, thereby keeping the piston 7 lubricated during its movement through the cylinder. Threaded upon the outer end of the piston section, is a piston member 24, between which and the inner surface of the cylinder 15, antifrictional ball bearings 25 are interposed. Interposed between the piston member 24 and the cap 16, is a coil spring 26, thereby additionally yieldably mounting or holding the piston section. A suitable cotter pin or the like 27 extends transversely of the outer end of the piston section, thereby preventing the piston member 24 from screwing off the outer end of the piston section. The cap 16 is provided with an orifice 28 through which suitable lubricants may be injected into the cylinder section for lubricating the moving parts therein. Arranged in the cylinder section, adjacent the cap 16, is a suitable rubber buffer 29, against which the outer end of the piston section may contact in order to absorb excessive shock or jar. In Figs. 3 and 4, the spokes consist of the sections 7ª and 8, the adjacent ends of which are connected by the yieldable couplers 12 in the same manner as the sections 7 and 8 in Figs. 1 and 2 are connected. The section 7ª of each spoke in Figs. 3 and 4 corresponds to the piston section 7 in Figs. 1 and 2. However, instead of the sections 7ª operating in a cylinder, the outer end of the section 7ª terminates in a U-shaped part 29, which arches the annular flange 4, and has its forks 30 pivoted to said flange by means of the bolts 31 and nuts 32. The bowed spring couplers 12 are each tapered from the center of the arch toward its opposite ends, as shown, thereby strengthening the spring, yet, at the same time, allowing the requisite resiliency. From the foregoing, in connection with the drawing, it is to be seen there has been provided improved yieldable means between the spoke sections.

The invention having been set forth, what is claimed as new and useful, is:—

In a resilient wheel, the combination of a hub and a rim, of a plurality of spokes connecting the hub and the rim, each spoke consisting of a pair of spoke sections, a yieldable spring coupler connecting the adjacent ends of the spoke sections, one of said spoke sections being fixed rigidly to the hub, the other spoke section comprising two parts, a cylinder part, pivoted to the rim, and a piston part yieldably mounted in the cylinder part.

In testimony whereof I have signed my name to this specification in the presence of two subscribing witnesses.

SIDNEY C. WALLACE.

Witnesses:
FRITHJOF JOHNSON,
CHARLES RINGER.

Copies of this patent may be obtained for five cents each, by addressing the "Commissioner of Patents, Washington, D. C."